United States Patent [19]

Deutschländer et al.

[11] 4,245,734
[45] Jan. 20, 1981

[54] CONVEYOR FOR REORIENTING RECTANGULAR ITEMS

[75] Inventors: Gert Deutschländer, Neuhausen am Rheinfall, Switzerland; Alfred Wipf, Jestetten, Fed. Rep. of Germany

[73] Assignee: SIG Schweizerische Industrie-Gesellschaft, Neuhausen am Rheinfall, Switzerland

[21] Appl. No.: 56,289

[22] Filed: Jul. 10, 1979

[30] Foreign Application Priority Data

Jul. 12, 1978 [CH] Switzerland ............ 7590/78

[51] Int. Cl.$^3$ .............................................. B65G 47/24
[52] U.S. Cl. .................................. 198/412; 198/457
[58] Field of Search ............... 198/411, 412, 413, 456, 198/457, 476, 598

[56] References Cited

U.S. PATENT DOCUMENTS

| | | | |
|---|---|---|---|
| 3,812,948 | 5/1974 | Luginbuhl | 198/476 |
| 3,900,096 | 8/1975 | Nack et al. | 198/476 |

FOREIGN PATENT DOCUMENTS 2710180  9/1978  Fed. Rep. of Germany ......... 198/457
362364  7/1962  Switzerland .

*Primary Examiner*—Jeffrey V. Nase
*Attorney, Agent, or Firm*—Spencer & Kaye

[57] ABSTRACT

Flat, rectangular items are, in a contacting series, conveyed by an input conveyor to an output conveyor, on which the items are to be further advanced by pusher members such that those sides of the items which were transversely oriented with respect to the advancing direction on the input conveyor are parallel to the advancing direction on the output conveyor and further, that the items are spaced from one another on the output conveyor. The angle defined by the directions of advance on the two conveyors is less than 90°. In the zone of reorientation each item is engaged by a pusher member from behind and is pushed off laterally from the input conveyor onto the output conveyor. At the same time, a moving reorienting member engages a frontal part of the item and, while a diametrically opposite item corner is in engagement with an abutment, the reorienting member moves the item into alignment with a guide oriented parallel to the direction of advance of the output conveyor.

8 Claims, 4 Drawing Figures

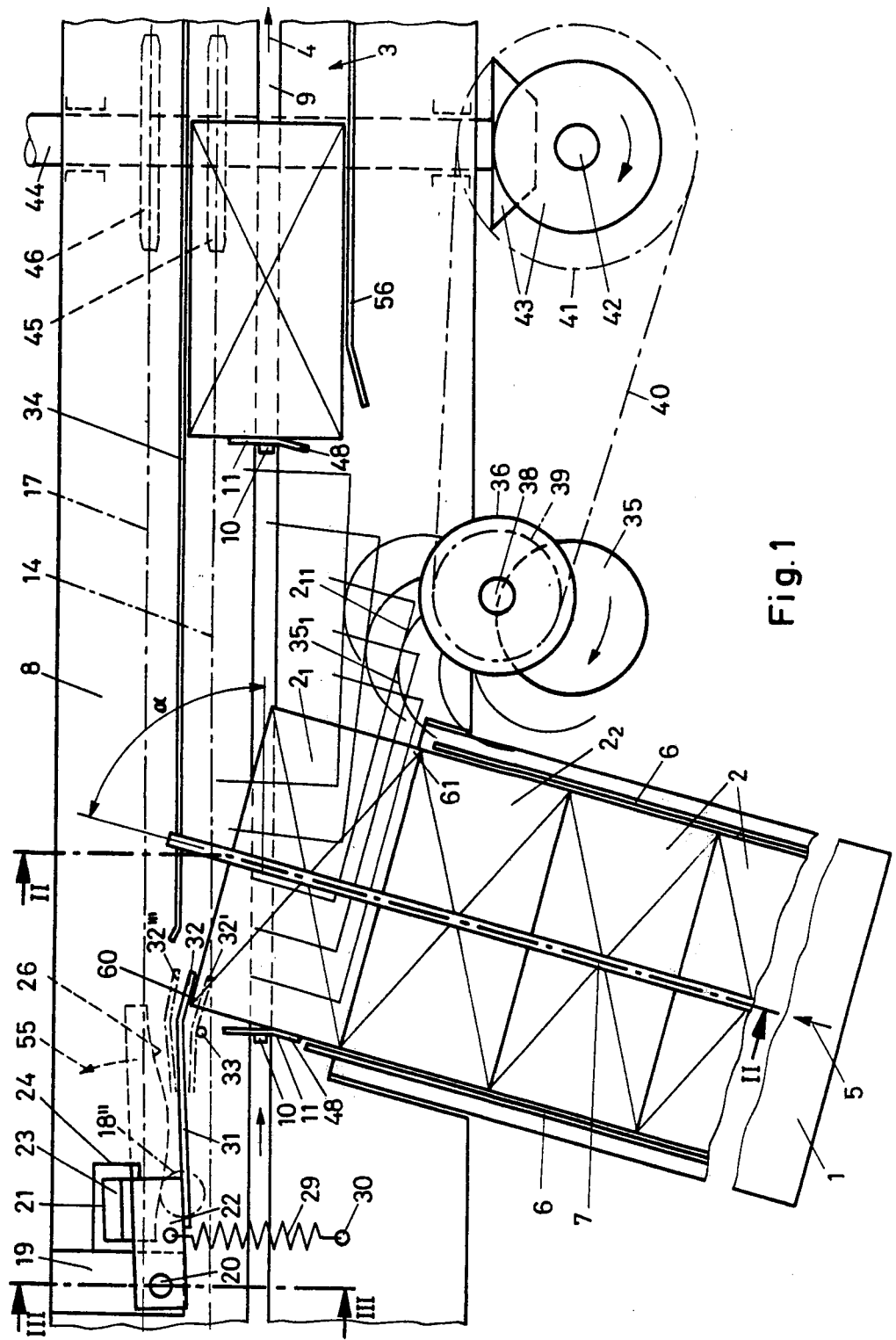

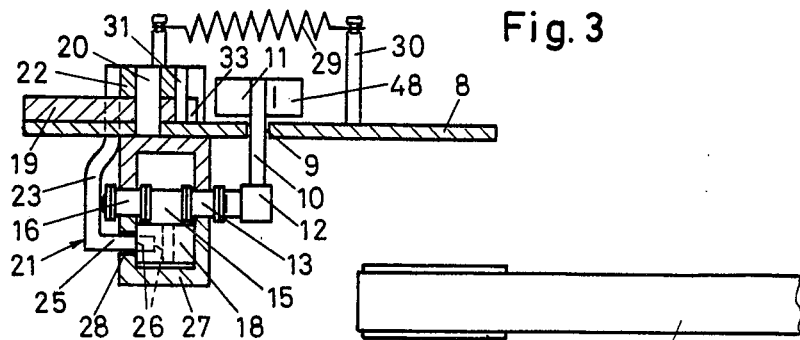
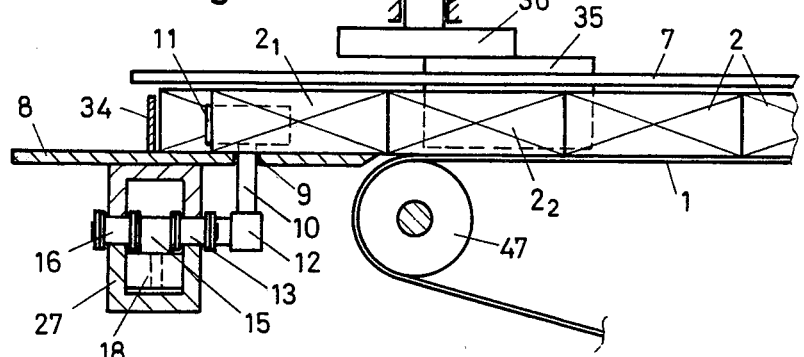
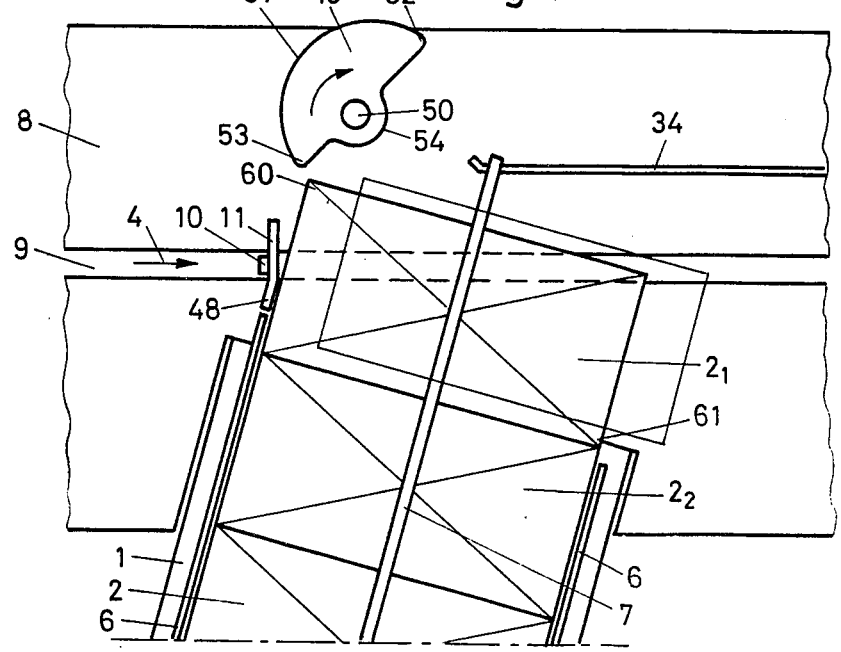

CONVEYOR FOR REORIENTING RECTANGULAR ITEMS

BACKGROUND OF THE INVENTION

This invention relates to a conveyor apparatus for separating and reorienting advancing items having a flat, at least approximately rectangular shape. The apparatus has an input conveyor which advances the items to an output conveyor provided with item pusher members. The conveying directions of the input and output conveyors define an angle less than 90°. On the input conveyor the long sides of the items are in contact with one another. On the output conveyor the items are separated from one another and are advanced in their length dimension by the respective pusher members of the output conveyor so that a first corner of the item which was a leading corner on the input conveyor becomes a trailing corner on the output conveyor and a diametrically located, originally trailing second corner becomes a leading corner subsequent to a reorientation of the item. During reorientation the first corner abuts a stop.

An apparatus of the above-outlined type is known and is disclosed, for example, in Swiss Pat. No. 362,364. In such an apparatus in the reorientation zone there is provided a curved guide on which the above-defined second corner of the item slides as the item is being advanced by the pusher member of the output conveyor. The force exerted by the guide on the second corner of the item effects the reorientation thereof.

It is a disadvantage of the above-noted arrangement that in case of delicate articles, such as wafers, candy bars or the like, the corner of the article may be damaged, resulting in rejects which often cannot be removed from the further chain of processing. In case the corner is damaged to a substantial extent, the fragments which have broken off the item may even endanger the operation of the apparatus.

SUMMARY OF THE INVENTION

It is an object of the invention to provide an improved conveyor apparatus of the above-outlined type from which the discussed disadvantages are eliminated.

This object and others to become apparent as the specification progresses, are accomplished by the invention, according to which, briefly stated, the conveyor apparatus includes a moving (driven) reorienting element which, in a guide-free reorientation zone affects in such a manner the trailing long side of the item already engaged by the pusher member of the output conveyor that it aligns the trailing long side at least approximately with a guide of the output conveyor.

The above-discussed second corner of the item is, during the reorientation, free from being guided or channeled in any manner; such reorientation is effected solely by the reorienting element engaging the trailing long side of the item, or, in more general terms, that side of the item which is the trailing transverse side with respect to the advancing direction of the input conveyor.

It is a significant advantage of the invention that the output of the apparatus can be significantly increased; the output rate in prior art arrangements had to be limited since the danger of breakage increases with the handling speed.

According to a particularly advantageous feature of the invention, the stop abutted by the above-defined first corner of the item yields to a significant extent as it is in contact with the item. In this manner each item is, with no stresses imparted thereon, advanced by the pusher member still in a position substantially transverse to the input conveyor and thus each item can be engaged by the reorienting element in a more effective manner.

BRIEF DESCRIPTION OF THE DRAWINGS

FIG. 1 is a schematic top plan view of a preferred embodiment of the invention;

FIG. 2 is a sectional view taken along line II—II of FIG. 1.

FIG. 3 is a sectional view taken along line III—III of FIG. 1.

FIG. 4 is a fragmentary schematic top plan view of another preferred embodiment of the invention.

DESCRIPTION OF THE PREFERRED EMBODIMENTS

Turning now to FIG. 1, the apparatus shown therein comprises a continuously driven endless input conveyor belt 1 which advances flat, substantially rectangular items 2, such as wafers, in such an orientation that the long sides of the items are oriented transversely to the conveying direction as indicated by the arrow 5 and the long sides of the consecutive items are in contact with one another. The items 2 are to be transferred to an output conveyor 3 which advances the articles in the direction indicated by the arrow 4, which defines an acute angle α with the conveying direction of the input conveyor 1, indicated by the arrow 5. The angle α is preferably between 60° and 85°. The items 2 should be so oriented on the output conveyor 3 that their long sides are parallel to the conveying direction 4 and further, the consecutive items are at a certain distance from one another, the magnitude of which depends, for example, on the requirements of a packing machine which would be arranged downstream of the output conveyor 3. On the input conveyor 1 the short sides of the items 2 are guided between two stationary guides 6. A further guide 7 extends centrally and longitudinally above the input conveyor 1 at a distance therefrom which is slightly greater than the vertically measured expected maximum thickness of the items 2, as it may be well observed in FIG. 2.

Referring now to FIGS. 1, 2 and 3, the output conveyor 3 has a horizontal track 8 which is provided with a slot 9 extending in the middle of the track 8 in the conveying direction 4. Through the slot 9 project vertical pusher arms 10 to which there are secured respective pusher plates 11. The pusher arms 10 are connected by respective joints 12 with links 13 of an endless chain 14. The chain link 13 is coupled by means of a connecting member 15 with a link 16 of a second endless chain 17. The connecting member 15 rotatably supports a roller 18. On the track 8 there is secured a short member 19 which is transverse to the direction 4 and which serves for supporting a vertical pin 20 on which (or with which) there can pivot an angled control lever 21. The latter comprises a first horizontal portion 22 which is situated above the transverse member 19 and which is followed by a vertical part 23 projecting downwardly through an aperture 24 provided in the track 8. The lower end of the portion 23 of the control lever 21 is followed by a horizontal portion 25 which has a control edge 26 cooperating with each roller 18. For this purpose, in a guide box 27 serving for the guidance of the chain links 13 and 16 and the rollers 18 there is provided a lateral slot 28 through which projects the horizontal lower portion 25 of the control lever 21 for engaging each roller 18. As long as a roller 18 is situated in the zone of the control edge 26, the contact is maintained by means of a tension spring 29 which exerts a force on the upper portion 22 of the control lever 21 and which, at its other end, is secured to a stationary pin 30, affixed, for example, to a frame component of the apparatus. To the upper portion 22 of the control lever 21, there is further secured an arm 31 which has a slightly angled terminus 32 serving as an abutment. In case no roller 18 is situated in the zone of the control edge 26, the terminus 32 is in engagement with a stationary stop pin 33 as indicated at 32'. As a roller 18 begins its cooperation with the control edge 26 in the dash-dotted position 18" (FIG. 1), the control lever 21 is pivoted in the direction of the arrow 55 and eventually assumes a position in which its terminus 32''' is in alignment with a lateral guide 34 of the output conveyor 3.

When the leading item $2_1$ which is still located in a transverse orientation on the input conveyor 1, is pushed by the consecutive article $2_2$ onto the track 8, its leading left corner 60 engages the stop 32' and follows it up to the position 32'''. The abutment 32 prevents an excessively rapid advance of the article $2_1$ which would adversely affect its proper reorientation into the new direction 4. The counter pressure of the yielding abutment 32 exerted on the corner 60 is slight so that no risk of damaging the corner 60 exists. The roller 18 is shown only in its above-noted starting position 18" in FIG. 1 and for the sake of clarity is thus not illustrated in the position that corresponds to that of the pusher member 11.

Turning now in particular to FIGS. 1 and 2, the reorientation of the article $2_1$ is effected by a circular reorienting member 35 affixed eccentrically to the underside of a disc 36 which is mounted at the lower end of a vertical shaft 38 which is supported at 37 and carrying a belt pulley 39 at its upper end. The belt pulley 39 is coupled by a slip-free endless belt 40 with a belt pulley 41 which, in turn, is mounted on a vertical shaft 42. The vertical shaft 42 is driven by a pair of bevel gears 43 by means of a horizontal shaft 44 which carries sprockets 45 and 46 for driving the chains 14 and 17. The shaft 42 preferably also supplies power to the continuous drive of the input conveyor 1 trained about an end roller 47 in the zone of the track 8.

Upon rotation of the shaft 38, the circular reorienting member 35 successively assumes the positions indicated with thin, solid-line arcs. At the same time, the item $2_1$ is first displaced only transversely to the belt 1 by means of a tab 48 affixed to the advancing pusher member 11. The plane of engagement of the tab 48 is parallel to the direction of motion 5 of the belt 1. In the position $35_1$ the reorienting member 35 contacts that long side of the article $2_1$ (which is then in position $2_{11}$) which was the trailing side on the input conveyor 1 and as a result, upon further clockwise travel of the reorienting member 35 as viewed in FIG. 1, an alignment of the article $2_1$ with the conveying direction 4 occurs. Thus, the item corner 60 which on the input conveyor 1 was located—relative to the item itself—in the front and at the left, slides along the guide 34 and eventually becomes a left trailing corner on the output conveyor 3. It is seen that at the same time the articles 2 on the track 8 assume a distance from one another which corresponds to the difference between the distance adjoining article pusher members 11 and the length of a long side of the items 2.

It is to be noted that during the reorienting motion of the articles, the right-hand trailing corner 61 of the article $2_1$ between the end of the right-hand guide 6 of the input conveyor 1 and the beginning of a right-hand guide 56 of the output conveyor 3 is not in contact with any guide contrary to the known arrangements discussed before. Consequently, the corner 61 which in the earlier arrangements was exposed to the high risk of breakage, is not stressed in any manner which would lead to such breakage. The conveyor apparatus according to the invention can operate with more than 50% greater output than the prior art arrangements handling articles of the same type.

The reorienting member 35 need not necessarily be a circular disc continuously orbited in a circle by the disc 36. It thus may be sufficient to provide a curved, convex cam at the edge of the disc 36 in order to achieve practically the same effect.

Turning now to FIG. 4, there is shown an alternative to the control arm 21. Thus, the latter is replaced by a continuously rotating abutment cam 49 mounted on a vertical shaft 50 which, in turn, is supported in a bearing (not shown) mounted on the track 8 and which is preferably driven by the shaft 42 (FIG. 1). The cam 49 has, along its circumference, a portion 51 of spiral course which extends through an angle of approximately 180° from a point 52 of maximum radius to a point 53 of minimum radius. The cam 49 has a hub portion 54 which has no item-engaging function.

As the item $2_1$ is pushed forwardly by the item $2_2$, the corner 60 thereof first engages the spiral portion 51 of the cam 49 in the vicinity of the point 52 and thereafter, the corner 60 slides on the spiral edge up to the point 53. Thus, the rotating cam 49 functions as a rearwardly yielding abutment with regard to the corner 60. In the position of the article $2_1$ shown in full lines, its corner 60 has just left the effective portion 51 of the cam 49. Then the article $2_1$ is, by means of the reorienting member 35 (not shown in FIG. 4) pivoted about the pusher member 11 which, with its tab 48, advances the article $2_1$ again first transversely to the conveyor 1 and then in the advancing direction 4 of the output conveyor 3. The right corner 61, which was a trailing corner on the input conveyor 1, then assumes a leading position at the right on the output conveyor without any force effect from any guide means.

While the rearwardly yielding abutment 32 (FIG. 1) or 49 (FIG. 4) has been found to be very advantageous for a rapid and gentle separation and reorientation of the articles 2, it is feasible to omit such an abutment and utilize, for example, resilient or stepped abutments instead. It is even feasible to allow the corner 60 to engage directly the guide 34 of the output conveyor 3.

While as a rule the items 2 are one-piece articles, the conveyor apparatus according to the invention is adapted to handle, as a one-piece item, two or more parts which complement one another to a rectangular bar.

It is to be understood that the above description of the present invention is susceptible to various modifications, changes and adaptations and the same are intended to be comprehended within the meaning and range of equivalents of the appended claims.

What is claimed is:

1. In a conveyor apparatus for reorienting and separating at least approximately rectangular, flat items, including an input conveyor advancing the items in a first direction of advance in an orientation wherein parallel first and second sides of each article are generally perpendicular to the first direction of advance and wherein said first and second sides of consecutive items are in contact with one another; said first side of each item is a leading side and said second side of each item is a trailing side on said input conveyor; each item having a first corner which is a leading corner on the input conveyor and a second corner which is diametrically opposite the first corner; an output conveyor arranged at a discharge end of the input conveyor for receiving the items from the input conveyor; the output conveyor including pusher members for advancing the articles in a second direction of advance which forms an angle of less than 90° with the first direction of advance; a turning means for turning each item during its transfer from the input conveyor to the output conveyor, whereby said first and second sides of each item assume a position parallel to said second direction of advance and said first corner of each item assumes a trailing position on said output conveyor; said turning means including an abutment engaging said first corner during reorientation of the respective item; the improvement wherein said output conveyor has a guide arranged in an orientation parallel to said second direction of advance for engaging and guiding said first side of each item and further wherein said turning means includes a moving reorienting means for engaging solely said second side of each item while being moved by the respective said pusher member of said output conveyor for aligning said first and second sides of each item into an orientation at least approximately parallel to said guide, whereby the second corner of each item is free from being engaged during reorientation of the item; said turning means further comprising driving means for moving said reorienting means; the improvement further comprising abutment moving means for periodically displacing said abutment in said first direction of advance, whereby said abutment executes a yielding motion with respect to the first corner of each item during engagement of said abutment with the first item corner while the item is displaced in said first direction of advance.

2. A conveyor apparatus as defined in claim 1, wherein said abutment moving means comprises a control lever carrying said abutment; means for pivotally supporting said control lever; spring means for urging said control lever in a direction opposite said yielding motion; and control lever actuating means for moving said control lever against the force exerted by said spring means in coordination with the travel of the respective said pusher members in said second direction of advance.

3. A conveyor apparatus as defined in claim 2, further comprising a chain means carrying said pusher members; said control lever actuating means including a roller associated with each said pusher member and carried by said chain means; said control lever having a portion provided with a control edge to cooperate with the respective roller, whereby the roller, in the course of its displacement by said chain means, effects a pivotal motion of said control lever against the force exerted by said spring means.

4. A conveyor apparatus as defined in claim 2, wherein each said pusher member comprises an item engaging tab having a portion oriented parallel to said first direction of advance, whereby each item, prior to its reorientation, is engaged by said portion of the respective item engaging tab.

5. A conveyor apparatus as defined in claim 1, wherein said abutment comprises a rotary cam having a rotary axis and a periphery of spiral course arranged to engage said first corner of each item during reorientation thereof and further wherein said abutment moving means comprises a drive for continuously rotating said cam, whereby said first corner of each item glides along said periphery from a point of relatively large distance from the rotary axis toward a point of relatively small distance from the rotary axis.

6. In a conveyor apparatus for reorienting and separating at least approximately rectangular, flat items including an input conveyor advancing the items in a first direction of advance in an orientation wherein parallel first and second sides of each article are generally perpendicular to the first direction of advance and wherein said first and second sides of consecutive items are in contact with one another; said first side of each item is a leading side and said second side of each item is a trailing side on said input conveyor; each item having a first corner which is a leading corner on the input conveyor and a second corner which is diametrically opposite the first corner; an output conveyor arranged at a discharge end of the input conveyor for receiving the items from the input conveyor; the output conveyor including pusher members for advancing the articles in a second direction of advance which forms an angle of less than 90° with the first direction of advance; a turning means for turning each item during its transfer from the input conveyor to the output conveyor, whereby said first and second sides of each item assume a position parallel to said second direction of advance and said first corner of each item assumes a trailing position on said output conveyor; said turning means including an abutment engaging said first corner during reorientation of the respective item; the improvement wherein said output conveyor has a guide arranged in an orientation parallel to said second direction of advance for engaging and guiding said first side of each item and further wherein said turning means includes a moving reorienting means for engaging solely said second side of each item while being moved by the respective said pusher member of said output conveyor for aligning said first and second sides of each item into an orientation at least approximately parallel to said guide, whereby the second corner of each item is free from being engaged during reorientation of the item; said moving reorienting means comprising a circular disc having a convex periphery cooperating with said second side of each item and said turning means further comprising driving means for continuously rotating said circular disc.

7. A conveyor apparatus as defined in claim 6, wherein said circular disc is eccentrically affixed to said driving means.

8. A conveyor apparatus as defined in claim 7, wherein said driving means comprises a driving disc; and further wherein said circular disc is eccentrically affixed to said driving disc.

* * * * *